United States Patent
Yamada et al.

(10) Patent No.: US 12,540,199 B2
(45) Date of Patent: Feb. 3, 2026

(54) MOLDING MATERIAL PRODUCTION METHOD AND MOLDING MATERIAL

(71) Applicant: SEIKO EPSON CORPORATION, Tokyo (JP)

(72) Inventors: Atsushi Yamada, Chino (JP); Shinobu Yokokawa, Okaya (JP); Hirofumi Hokari, Chino (JP); Hajime Kakishita, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 18/613,367

(22) Filed: Mar. 22, 2024

(65) Prior Publication Data
US 2024/0317896 A1    Sep. 26, 2024

(30) Foreign Application Priority Data
Mar. 23, 2023    (JP) ................. 2023-047142

(51) Int. Cl.
C08B 3/08    (2006.01)
C08J 3/00    (2006.01)

(52) U.S. Cl.
CPC ................ C08B 3/08 (2013.01); C08J 3/005 (2013.01); C08J 2301/10 (2013.01); C08J 2367/04 (2013.01); C08J 2401/10 (2013.01); C08J 2467/04 (2013.01)

(58) Field of Classification Search
CPC .... C08J 2301/10; C08J 3/005; C08J 2367/04; C08J 2467/04; C08J 2401/10; C08L 1/10; C08L 67/04; C08B 3/06; C08B 3/08; C08B 1/003

USPC ..................... 252/500; 536/56, 64
See application file for complete search history.

(56) References Cited

U.S. PATENT DOCUMENTS

| | | | | |
|---|---|---|---|---|
| 2014/0024825 A1* | 1/2014 | Kano | .............. | C08B 13/00 |
| | | | | 536/68 |
| 2018/0291117 A1 | 10/2018 | Shimura et al. | | |
| 2019/0161557 A1* | 5/2019 | Hashizume | ............ | B01D 69/08 |
| 2023/0118481 A1* | 4/2023 | Fukui | .............. | C08L 1/02 |
| | | | | 523/202 |

FOREIGN PATENT DOCUMENTS

| | | | | |
|---|---|---|---|---|
| CA | 2315507 A1 | 2/2001 | | |
| CN | 107226930 A * | 10/2017 | ............... | C08B 3/06 |
| JP | 2001-089501 A | 4/2001 | | |
| WO | 2012-133003 A1 | 10/2012 | | |
| WO | 2017-061190 A1 | 4/2017 | | |
| WO | WO-2021153699 A1 * | 8/2021 | ............. | C08B 15/04 |

OTHER PUBLICATIONS

Translation of CN-107226930-A (Year: 2025).*

* cited by examiner

Primary Examiner — Tri V Nguyen
(74) Attorney, Agent, or Firm — Harness, Dickey & Pierce, P.L.C.

(57) ABSTRACT

A molding material production method according to the present disclosure includes an acylation step of conducting acylation reaction of cellulose, while irradiating, with microwaves of 0.4 GHz or more and 6.0 GHz or less, a mixture including the cellulose, an acylation agent, and a solvent, in which the solvent is an ionic liquid or a liquid including a salt, and the mixture includes the acylation agent at a ratio of 0.2 equivalents or more based on all hydroxy groups included in the cellulose.

5 Claims, 1 Drawing Sheet

TABLE 1

| | PRODUCTION CONDITIONS FOR MOLDING MATERIAL INCLUDING NO THERMOPLASTIC RESIN | | | | | RESULTS OF MOLDING MATERIAL INCLUDING NO THERMOPLASTIC RESIN | | | | | RESULT OF MOLDING MATERIAL INCLUDING THERMOPLASTIC RESIN |
|---|---|---|---|---|---|---|---|---|---|---|---|
| | IONIC LIQUID/SALT CONSTITUTING SOLVENT | ACYLATION AGENT USE AMOUNT | MICROWAVE FREQUENCY | ELECTROCONDUCTIVITY | REACTION TIME | DS VALUE | WEIGHT AVERAGE MOLECULAR WEIGHT | LOW MOLECULAR WEIGHT CONTENT RATIO | MOLDABILITY | TENSILE STRENGTH | TENSILE STRENGTH |
| EXAMPLE 1 | 1-ALLYL-3-BUTYLIMIDAZOLIUM BROMIDE | 6 EQUIVALENTS | 0.4 GHz | $10^{-2}$ S/cm | 4 HOURS | 2.6 | 322,000 | 10% | A | B | B |
| EXAMPLE 2 | 1-ALLYL-3-BUTYLIMIDAZOLIUM BROMIDE | 6 EQUIVALENTS | 0.915 GHz | $10^{-2}$ S/cm | 2 HOURS | 2.6 | 322,000 | 5% | A | A | A |
| EXAMPLE 3 | 1-ALLYL-3-BUTYLIMIDAZOLIUM BROMIDE | 6 EQUIVALENTS | 5.8 GHz | $10^{-2}$ S/cm | 4 HOURS | 2.6 | 322,000 | 10% | A | B | B |
| EXAMPLE 4 | 1-BUTYL-3-METHYLPYRIDINIUMBIS (TRIFLUOROMETHYLSULFONYL)IMIDE | 6 EQUIVALENTS | 0.915 GHz | $10^{-2}$ S/cm | 4 HOURS | 2.6 | 322,000 | 10% | A | B | B |
| EXAMPLE 5 | LITHIUM CHLORIDE | 6 EQUIVALENTS | 0.915 GHz | $10^{-2}$ S/cm | 4 HOURS | 2.6 | 322,000 | 10% | A | B | B |
| EXAMPLE 6 | 1-ALLYL-3-BUTYLIMIDAZOLIUM BROMIDE | 9 EQUIVALENTS | 0.915 GHz | $10^{-11}$ S/cm | 2 HOURS | 3.0 | 336,000 | 5% | C | A | A |
| EXAMPLE 7 | 1-ALLYL-3-BUTYLIMIDAZOLIUM BROMIDE | 8 EQUIVALENTS | 0.915 GHz | $10^{-7}$ S/cm | 2 HOURS | 2.8 | 336,000 | 5% | B | A | A |
| EXAMPLE 8 | 1-ALLYL-3-BUTYLIMIDAZOLIUM BROMIDE | 0.2 EQUIVALENTS | 0.915 GHz | $10^{-6}$ S/cm | 2 HOURS | 0.2 | 256,000 | 5% | A | B | B |
| COMPARATIVE EXAMPLE 1 | 1-ALLYL-3-BUTYLIMIDAZOLIUM BROMIDE | 6 EQUIVALENTS | 0.3 GHz | $10^{-2}$ S/cm | 6 HOURS | 2.6 | 322,000 | 20% | A | C | C |
| COMPARATIVE EXAMPLE 2 | 1-ALLYL-3-BUTYLIMIDAZOLIUM BROMIDE | 6 EQUIVALENTS | 20 GHz | $10^{-2}$ S/cm | 6 HOURS | 2.6 | 322,000 | 20% | A | C | C |
| COMPARATIVE EXAMPLE 3 | — | 6 EQUIVALENTS | 0.915 GHz | $10^{-2}$ S/cm | 6 HOURS | 2.6 | 322,000 | 20% | A | C | C |
| COMPARATIVE EXAMPLE 4 | 1-ALLYL-3-BUTYLIMIDAZOLIUM BROMIDE | 0.1 EQUIVALENTS | 0.915 GHz | $10^{-10}$ S/cm | 2 HOURS | 0.1 | 253,000 | 5% | A | C | C |

MOLDING MATERIAL PRODUCTION METHOD AND MOLDING MATERIAL

The present application is based on, and claims priority from JP Application Serial Number 2023-047142, filed Mar. 23, 2023, the disclosure of which is hereby incorporated by reference herein in its entirety.

BACKGROUND

1. Technical Field

The present disclosure relates to a molding material production method and a molding material.

2. Related Art

Substitution of heretofore used plastic materials with a molding material using cellulose, which is an abundant natural material derived from plants, has been attempted as a measure against depletion of petroleum oil and a measure against global warming.

For example, a molding material including cellulose fibers and a resin or the like is known. However, a molded body produced by using such a molding material has a problem of low durability.

In this regard, a cellulose derivative in which hydrogen atoms of hydroxy groups in cellulose are substituted with a short chain organic group having two carbon atoms, a medium chain organic group having 3 to 5 carbon atoms, and a long chain organic group having 6 to 30 carbon atoms at a predetermined ratio has been suggested for application to a molded body with improved thermoplasticity, water resistance, impact strength, and the like (see International Publication No. 2017/061190).

However, when a molded body is produced by using the cellulose derivative described in International Publication No. 2017/061190, the following problem arises: part of the cellulose skeleton is decomposed upon receiving shear force due to heat, mechanical stirring, and the like during kneading, molding, and the like, causing generation of a low molecular weight component to decrease mechanical strength of a molded body produced.

SUMMARY

The present disclosure has been made in order to solve the above problem and can be implemented as the following application examples.

A molding material production method according to an application example of the present disclosure includes an acylation step of conducting acylation reaction of cellulose, while irradiating, with a microwave of 0.4 GHz or more and 6.0 GHz or less, a mixture including the cellulose, an acylation agent, and a solvent, in which the solvent is an ionic liquid or a liquid including a salt, and the mixture includes the acylation agent at a ratio of 0.2 equivalents or more based on all hydroxy groups included in the cellulose.

A molding material according to an application example of the present disclosure includes: a cellulose derivative in which hydroxy groups included in cellulose are at least partially acylated; and at least one kind of ion selected from the group consisting of an imidazolium ion, a pyridinium ion, a lithium ion, and a chloride ion, in which a content ratio in the cellulose derivative of a low molecular weight component having a molecular weight of a quarter or less of a peak top molecular weight in a molecular weight distribution measured by gel permeation chromatography is 15% or less, and electroconductivity at a temperature of 23° C. and a relative humidity of 50% is $1.0 \times 10^{-6}$ S/cm or more.

BRIEF DESCRIPTION OF THE DRAWINGS

FIG. 1 is a table collectively showing production conditions for a molding material including no thermoplastic resin according to each of Examples and Comparative Examples, as well as measurement results and evaluation results in relation to the molding materials including no thermoplastic resin and molding materials including a thermoplastic resin.

DESCRIPTION OF EMBODIMENTS

A preferable embodiment of the present disclosure will be described in detail below.

[1] Molding Material

First, a molding material of the present disclosure will be described.

The molding material of the present disclosure includes: a cellulose derivative in which hydroxy groups included in cellulose are at least partially acylated; and at least one kind of ion selected from the group consisting of an imidazolium ion, a pyridinium ion, a lithium ion, and a chloride ion. In the cellulose derivative included in the molding material, the content ratio of a low molecular weight component having a molecular weight of a quarter or less of a peak top molecular weight in a molecular weight distribution measured by gel permeation chromatography is 15% or less. Electroconductivity of the molding material at a temperature of 23° C. and a relative humidity of 50% is $1.0 \times 10^{-6}$ S/cm or more.

Consequently, a molding material which can be suitably used for production of a molded body with excellent tensile strength can be provided. In addition, a molding material exhibiting excellent moldability during production of a molded body can be provided. Furthermore, electrification of a molded body produced by using the molding material can be successfully prevented.

On the other hand, when the above-described conditions are not satisfied, satisfactory results are not obtained. For example, even in a case in which a cellulose derivative in which hydroxy groups included in cellulose are at least partially acylated is included in a molding material, tensile strength of a molded body produced by using the molding material and moldability during production of a molded body are not excellent enough when the predetermined ion described above is not included.

When the content ratio of the low molecular weight component in the cellulose derivative is too high, tensile strength of a molded body produced by using the molding material cannot be made excellent enough.

When the electroconductivity at a temperature of 23° C. and a relative humidity of 50% is too low, a molded body produced by using the molding material is likely to charge.

The molding material of the present disclosure can be suitably produced in a method described later.

[1-1] Cellulose Derivative

The molding material of the present disclosure includes the cellulose derivative in which hydroxy groups included in cellulose are at least partially acylated.

That is, the cellulose derivative included in the molding material of the present disclosure has a chemical structure in which —OH included in cellulose is at least partially converted to a —OCOR structure where R is a hydrocarbon group.

Moldability during production of a molded body and tensile strength of a molded body produced by using the molding material can be made excellent when such a cellulose derivative is included together with a certain ion described in detail later.

The cellulose derivative may include one kind of acyl group within a molecule or may include multiple kinds of acyl groups within a molecule.

The group represented by R described above may be an aromatic hydrocarbon group as long as R is a hydrocarbon group but is preferably an aliphatic hydrocarbon group.

Consequently, moldability during production of a molded body and tensile strength of a molded body produced by using the molding material can be made more excellent.

In addition, the group represented by R described above may be a hydrocarbon group with a linear chain or a hydrocarbon group with a branched chain, for example.

The number of carbon atoms in the group represented by R described above is preferably 1 or more and 18 or less, more preferably 2 or more and 6 or less, and still more preferably 2 or more and 4 or less.

Consequently, moldability during production of a molded body and tensile strength of a molded body produced by using the molding material can be made more excellent. In particular, even when the molding material includes cellulose, compatibility between cellulose and the cellulose derivative can be made more excellent, and moldability during production of a molded body and tensile strength of a molded body produced by using the molding material can be made more excellent.

Incidentally, when the cellulose derivative includes multiple kinds of acyl groups within a molecule, it is preferable that a weighted average of carbon chain lengths of groups represented by R described above constituting these multiple kinds of acyl groups satisfy the above requirement.

The group represented by R described above may be any hydrocarbon group but is preferably an alkyl group. Consequently, moldability during production of a molded body and tensile strength of a molded body produced by using the molding material can be made more excellent.

The DS value, that is, the substitution degree, which is a proportion of hydroxy groups esterified by acyl groups among all hydroxy groups included in cellulose, of the cellulose derivative is preferably 0.2 or more and 3.0 or less, more preferably 1.0 or more and 2.8 or less, and still more preferably 2.0 or more and 2.6 or less.

Consequently, moldability during production of a molded body and tensile strength of a molded body produced by using the molding material can be made more excellent. In particular, even when the molding material includes cellulose, compatibility between cellulose and the cellulose derivative can be made more excellent, and moldability during production of a molded body and tensile strength of a molded body produced by using the molding material can be made more excellent.

The molding material of the present disclosure may include at least one kind of the cellulose derivative or may include multiple kinds of the cellulose derivative.

The weight average molecular weight of the cellulose derivative obtained by gel permeation chromatography is preferably 10,000 or more and 500,000 or less, more preferably 100,000 or more and 450,000 or less, and still more preferably 200,000 or more and 400,000 or less.

Consequently, moldability during production of a molded body and tensile strength of a molded body produced by using the molding material can be made more excellent.

The content ratio in the cellulose derivative of a low molecular weight component having a molecular weight of a quarter or less of a peak top molecular weight in a molecular weight distribution measured by gel permeation chromatography is 15% or less. However, the content ratio of the low molecular weight component is preferably 12% or less, more preferably 10% or less, still more preferably 7% or less, and most preferably 5% or less. Consequently, the above-described effects are more significantly exhibited.

The glass transition temperature of the cellulose derivative is preferably 80° C. or higher and 200° C. or lower, more preferably 90° C. or higher and 180° C. or lower, and still more preferably 100° C. or higher and 170° C. or lower.

Consequently, moldability during production of a molded body and tensile strength of a molded body produced by using the molding material can be made more excellent.

The cellulose derivative can be successfully synthesized by acylating cellulose using an acylation agent. Synthesis of the cellulose derivative will be described later in detail.

The content of the cellulose derivative in the molding material of the present disclosure is preferably 10.0% by mass or more and 99.8% by mass or less, more preferably 20.0% by mass or more and 99.5% by mass or less, and still more preferably 40.0% by mass or more and 99.0% by mass or less.

Consequently, moldability during production of a molded body and tensile strength of a molded body produced by using the molding material can be made more excellent.

[1-2] Certain Ion

The molding material of the present disclosure includes a certain ion which is at least one kind of ion selected from the group consisting of an imidazolium ion, a pyridinium ion, a lithium ion, and a chloride ion.

Although the certain ion included in the molding material of the present disclosure is at least one kind of ion selected from the group consisting of an imidazolium ion, a pyridinium ion, a lithium ion, and a chloride ion, an imidazolium ion is preferable among them.

Consequently, moldability during production of a molded body and tensile strength of a molded body produced by using the molding material can be made more excellent.

The certain ion may form a salt with, for example, the cellulose derivative in the molding material.

The content of the certain ion in the molding material of the present disclosure is preferably 0.01% by mass or more and 5.0% by mass or less, more preferably 0.05% by mass or more and 1.0% by mass or less, and still more preferably 0.1% by mass or more and 0.5% by mass or less.

Consequently, moldability during production of a molded body and tensile strength of a molded body produced by using the molding material can be made more excellent.

[1-3] Thermoplastic Resin

The molding material of the present disclosure may further include a thermoplastic resin in addition to the cellulose derivative and the certain ion.

Consequently, thermoplasticity of the molding material of the present disclosure is made more excellent, and moldability during production of a molded body is made more excellent. In addition, uniformity in the molding material and in a molded body produced by using the molding material is improved, and more excellent physical properties such as tensile strength are provided in a molded body.

Examples of the thermoplastic resin include polyolefins such as a polyethylene and a polypropylene, polyesters such as an aliphatic polyester and an aromatic polyester, and one kind or a combination of two or more kinds selected therefrom can be used.

The aliphatic polyester is a polyester having no aromatic chemical structure and is a polyester in which all constituent monomers have no aromatic chemical structure. Examples of the aliphatic polyester include a polyester in which both the polycarboxylic acid component and the polyhydric alcohol component as constituent monomers have an aliphatic alkylene group. The aliphatic polyester may also be a polyester formed from a monomer having a hydroxy group and a carboxy group within a molecule. Examples of the aliphatic polyester formed from a monomer having a hydroxy group and a carboxy group within a molecule include polylactic acid.

When the aliphatic polyester has a chemical structure in which a polycarboxylic acid component having an aliphatic alkylene group and a polyhydric alcohol component having an aliphatic alkylene group are polymerized, the aliphatic polyester is preferably a polyester having a chemical structure in which an alkylenedicarboxylic acid having an alkylene group with a carbon chain length of 2 or more and 6 or less and an alkylene diol having an alkylene group with a carbon chain length of 2 or more and 8 or less are condensed.

In particular, when the molding material of the present disclosure includes polylactic acid as the thermoplastic resin, the molding material has the following advantage. That is, since polylactic acid can be produced from a biological material, consumption of underground resources can be suppressed even when a thermoplastic resin is mixed. In addition, effects described above such as improvement in moldability and improvement in physical properties of a molded body produced by using the molding material are also sufficiently provided.

When the molding material of the present disclosure includes the thermoplastic resin, the content of the thermoplastic resin in the molding material of the present disclosure is preferably 10.0% by mass or more and 80.0% by mass or less, more preferably 15.0% by mass or more and 75.0% by mass or less, and still more preferably 20.0% by mass or more and 58.0% by mass or less. Consequently, the above-described effects are more significantly provided.

When the molding material of the present disclosure includes polylactic acid, the proportion of polylactic acid accounting for the total amount of the thermoplastic resin included in the molding material of the present disclosure is preferably 50.0% by mass or more, more preferably 60.0% by mass or more, and still more preferably 70.0% by mass or more. Consequently, the above-described effects are more significantly provided.

In the case where the molding material of the present disclosure includes the thermoplastic resin, when the content of the cellulose derivative in the molding material of the present disclosure is denoted as XC [mass %], and the content of the thermoplastic resin is denoted as XR [mass %], it is preferable that the relationship $0.12 \leq XR/XC \leq 4.1$ be satisfied, it is more preferable that the relationship $0.18 \leq XR/XC \leq 3.1$ be satisfied, and it is still more preferable that the relationship $0.26 \leq XR/XC \leq 1.3$ be satisfied. Consequently, the above-described effects are more significantly provided.

[1-4] Solvent

The molding material of the present disclosure may include a solvent. Such a solvent can dissolve the cellulose derivative, for example.

Examples of the solvent include ionic liquids such as 1-allyl-3-butylimidazolium bromide, 1-butyl-3-methylpyridinium bis(trifluoromethylsulfonyl)imide, N-methyl-N-propylpyrrolidinium bis(fluorosulfonyl)imide, 1-ethyl-3-methylimidazolium bis(trifluoromethylsulfonyl)imide, 1-ethyl-3-methylimidazolium bis(fluorosulfonyl)imide, dimethylpropylimidazolium iodide, butylmethylimidazolium iodide, 1,2-dimethyl-3-n-propylimidazolinium iodide, 1-methyl-3-n-hexylimidazolinium iodide, 1,2-dimethyl-3-ethylimidazolium trifluoromethanesulfonate, 1-methyl-3-butylimidazolium nonafluorobutylsulfonate, 1-methyl-3-ethylimidazolium bis(trifluoromethyl)sulfonylimide, 1-methyl-3-n-hexylimidazolium bis(trifluoromethyl)sulfonylimide, 1-methyl-3-n-hexylimidazolium dicyanamide, lithium bisfluorosulfonylimide, lithium bistrifluoromethanesulfonylimide, 1-methyl-3-propylimidazolium bis(trifluorosulfonyl)imide, 1-ethyl-3-butylimidazoliumtetrafluoroborate, and 1-hexyl-3-methylimidazoliumhexafluorophosphate; water; monohydric alcohols such as methanol, ethanol, 1-propanol, 2-propanol, 1-butanol, and 2-butanol; dihydric alcohols such as ethylene glycol, propane glycol, and butanediol; dihydric alcohols including an ether bond such as diethylene glycol and dipropylene glycol; trihydric alcohols such as glycerin; and aprotic polar solvents such as dimethyl formamide, dimethyl acetamide, dimethyl sulfoxide, acetonitrile, methyl formamide, ethyl acetate, and tetrahydrofuran. One kind or a combination of two or more kinds thereof can be used.

When the molding material of the present disclosure includes the solvent, the solvent may dissolve the certain ion described above in the molding material. In other words, a liquid including the certain ion may function as a solvent dissolving the cellulose derivative.

When the molding material of the present disclosure includes the solvent, the content of the solvent in the molding material of the present disclosure is preferably 0.1% by mass or more and 80.0% by mass or less, more preferably 0.2% by mass or more and 70.0% by mass or less, and still more preferably 0.5% by mass or more and 65.0% by mass or less.

Incidentally, when the molding material of the present disclosure includes the solvent, the solvent may be removed when a molded body is produced, for example.

[1-5] Other Components

The molding material of the present disclosure may include components other than the components described above. Hereinafter, such components are also referred to as "the other components" in this section.

Examples of the other components include a flame retardant, a colorant, an insect repellent, a fungicide, an antioxidant, an ultraviolet absorber, an aggregation inhibitor, a mold release agent, cellulose, a derivative other than the cellulose derivative described above, hemicellulose, lignin, an acylation agent, an organic acid, and an ion other than the certain ion described above.

The content of the other components in the molding material of the present disclosure is preferably 10.0% by mass or less, more preferably 7.0% by mass or less, and still more preferably 5.0% by mass or less.

[1-6] Characteristics of Molding Material

As described above, electroconductivity at a temperature of 23° C. and a relative humidity of 50% of the molding material of the present disclosure is $1.0 \times 10^{-6}$ S/cm or more but is preferably $1.0 \times 10^{-4}$ S/cm or more, more preferably $1.0 \times 10^{-2}$ S/cm or more, and still more preferably 1.0 S/cm or more.

Consequently, electrification of a molded body produced by using the molding material can be more successfully prevented.

In addition, electroconductivity at a temperature of 23° C. and a relative humidity of 50% of the molding material of the present disclosure is preferably $1.0 \times 10^{11}$ S/cm or less, more preferably $1.0\times10^7$ S/cm or less, and still more preferably $1.0\times10^3$ S/cm or less. Consequently, moldability during production of a molded body can be made more excellent.

[2] Molding Material Production Method

Next, a method for producing the molding material of the present disclosure will be described.

The molding material production method according to the present disclosure includes an acylation step of conducting acylation reaction of cellulose, while irradiating, with microwaves of 0.4 GHz or more and 6.0 GHz or less, a mixture including the cellulose, an acylation agent, and a solvent.

The solvent included in the mixture is an ionic liquid or a liquid including a salt, and the mixture includes the acylation agent at a ratio of 0.2 equivalents or more based on all hydroxy groups included in the cellulose.

Consequently, a molding material production method that can be preferably used for production of a molded body excellent in tensile strength can be provided. In addition, moldability during production of a molded body can be made excellent. Furthermore, electrification of a molded body produced can be successfully prevented.

On the other hand, when the above-described conditions are not satisfied, satisfactory results are not obtained. For example, even in a case in which a step of reacting cellulose and an acylation agent is involved, when the step is carried out without microwave irradiation, the following problem arises: part of cellulose is decomposed upon receiving shear force due to heat and mechanical stirring, causing generation of a low molecular weight component to decrease mechanical strength of a molded body.

In addition, even in a case in which microwave irradiation is conducted in the step of reacting cellulose and an acylation agent, when the frequency of the microwaves is less than the above-described lower limit value, the proportion of the low molecular weight component of the cellulose derivative becomes too large, and tensile strength of a molded body produced by using the molding material cannot be made excellent enough.

Furthermore, even in a case in which microwave irradiation is conducted in the step of reacting cellulose and an acylation agent, when the frequency of the microwaves exceeds the above-described upper limit value, the proportion of the low molecular weight component of the cellulose derivative becomes too large, and tensile strength of a molded body produced by using the molding material cannot be made excellent enough.

Furthermore, even in a case in which a step of reacting cellulose and an acylation agent is involved, when an ionic liquid or a liquid including a salt is not used as the solvent in the step, the proportion of the low molecular weight component of the cellulose derivative becomes too large, and tensile strength of a molded body produced by using the molding material cannot be made excellent enough.

When the amount of the acylation agent used in the acylation step is less than the above-described lower limit value, acylation reaction does not successfully proceed, and tensile strength of a molded body produced by using the molding material cannot be made excellent enough.

[2-1] Acylation Step

The molding material production method according to the present disclosure includes the acylation step of conducting acylation reaction of cellulose, while irradiating, with microwaves of 0.4 GHz or more and 6.0 GHz or less, a mixture including the cellulose, an acylation agent, and a solvent.

[2-1-1] Cellulose

Cellulose is an abundant natural material derived from plants. Therefore, when cellulose is used as a raw material, environmental problems, conservation of underground resources, and the like can be suitably dealt with, and use of cellulose is preferable also from the viewpoints of stable supply of the molding material and a molded body produced by using the molding material, cost reduction, and the like. In addition, cellulose theoretically has especially high stiffness, and the cellulose derivative obtained by derivatizing cellulose through chemical modification is also theoretically excellent in stiffness. Accordingly, cellulose is advantageous also from the viewpoint of improving stiffness of a molded body.

Cellulose used in the acylation step may be cellulose preliminarily subjected to purification treatment or may be cellulose including impurities such as hemicellulose, lignin, and the like. More specifically, virgin pulp may be used as cellulose, and wastepaper, used cloth, and the like may be reused.

The content of cellulose in the mixture subjected to the acylation step is preferably 20.0% by mass or more and 95.0% by mass or less, more preferably 30.0% by mass or more and 90.0% by mass or less, and still more preferably 50.0% by mass or more and 87.0% by mass or less.

Consequently, cellulose as a raw material can be acylated at a higher reaction rate, and amounts of the solvent and the acylation agent used can be effectively decreased.

[2-1-2] Acylation Agent

The acylation agent functions to react with cellulose and acylate at least part of hydroxy groups included in the cellulose.

The number of carbon atoms of an acyl group included in the acylation agent is not particularly limited but is preferably 2 or more and 7 or less.

Examples of the acylation agent include a carboxylic anhydride, a carboxylic halide, and a carboxylic acid, and at least one selected from the group consisting of them can be used.

Examples of the carboxylic anhydride include acetic anhydride, propionic anhydride, and butyric anhydride. Examples of the carboxylic halide include acyl fluorides such as acetyl fluoride, propionyl fluoride, and butyryl fluoride; acyl chlorides such as acetyl chloride, propionyl chloride, and butyryl chloride; acyl bromides such as acetyl bromide, propionyl bromide, and butyryl bromide; and acyl iodides such as acetyl iodide, propionyl iodide, and butyryl iodide. Examples of the carboxylic acid include acetic acid, propionic acid, and butanoic acid.

The acylation agent may be used at a ratio of 0.2 equivalents or more based on all hydroxy groups included in cellulose included in the mixture but is preferably used at a ratio of 0.5 equivalents or more, more preferably used at a ratio of 1.0 equivalents or more, and still more preferably used at a ratio of 3.0 equivalents or more.

Consequently, hydroxy groups included in cellulose can be acylated at a sufficient ratio, and moldability during production of a molded body using the obtained molding material and tensile strength of a molded body produced by using the molding material can be made more excellent.

The acylation agent is preferably used at a ratio of 8.0 equivalents or less, more preferably used at a ratio of 7.5 equivalents or less, and still more preferably used at a ratio of 7.0 equivalents or less based on all hydroxy groups included in cellulose included in the mixture. In other words, the mixture preferably includes the acylation agent at a ratio of 8.0 equivalents or less, more preferably at a ratio of 7.5 equivalents or less, and still more at a ratio of 7.0 equivalents or less based on all hydroxy groups included in cellulose.

Consequently, hydroxy groups included in cellulose can be effectively prevented from being excessively acylated, hydrogen bonds are formed at a proper ratio in the cellulose derivative included in the molding material, and moldability of the molding material is made more excellent. In addition, since the amount of the acylation agent used can be decreased, said ratios are preferable also from the viewpoints of reducing costs for production of the molding material, resource saving, and the like.

[2-1-3] Solvent

The solvent included in the mixture functions to dissolve a component included in the mixture, for example, at least part of the acylation agent and functions to dissolve at least part of the cellulose derivative which is a reaction product, for example.

The solvent constituting the mixture is an ionic liquid or a liquid including a salt. Examples of the ionic liquid include 1-allyl-3-butylimidazolium bromide, 1-butyl-3-methylpyridiniumbis(trifluoromethylsulfonyl)imide, N-methyl-N-propylpyrrolidinium bis(fluorosulfonyl)imide, 1-ethyl-3-methylimidazolium bis(trifluoromethylsulfonyl)imide, 1-ethyl-3-methylimidazolium bis(fluorosulfonyl)imide, dimethylpropylimidazolium iodide, butylmethylimidazolium iodide, 1,2-dimethyl-3-n-propylimidazolinium iodide, 1-methyl-3-n-hexylimidazolinium iodide, 1,2-dimethyl-3-ethylimidazolium trifluoromethanesulfonate, 1-methyl-3-butylimidazolium nonafluorobutylsulfonate, 1-methyl-3-ethylimidazolium bis(trifluoromethyl)sulfonylimide, 1-methyl-3-n-hexylimidazolium bis(trifluoromethyl)sulfonylimide, 1-methyl-3-n-hexylimidazolium dicyanamide, lithium bisfluorosulfonylimide, lithium bistrifluoromethanesulfonylimide, 1-methyl-3-propylimidazolium bis(trifluorosulfonyl)imide, 1-ethyl-3-butylimidazoliumtetrafluoroborate, and 1-hexyl-3-methylimidazoliumhexafluorophosphate, and one kind or a combination of two or more kinds selected therefrom can be used.

When the ionic liquid is used, the ionic liquid preferably has an imidazolium salt structure.

Consequently, solubility of cellulose and the cellulose derivative can be made more excellent, acylation reaction is allowed to more successfully proceed, and the cellulose derivative generated can be more uniformly included in the reaction product.

Examples of a cation constituting the salt include monovalent cations such as alkali metal ions including a lithium ion, a sodium ion, and a potassium ion, an ammonium ion, an imidazolium ion, and a pyridinium ion; and divalent cations such as alkaline earth metal ions including a magnesium ion and a calcium ion.

Examples of an anion constituting the salt include monovalent anions such as halide ions including a fluoride ion, a chloride ion, a bromide ion, and an iodide ion, and a nitrate ion; divalent anions such as a sulfate ion; and trivalent anions such as a phosphate ion. Although a solution for the salt is not particularly limited, examples thereof include an aqueous solution.

When the solvent is the liquid including a salt, examples of a component dissolving the salt include water, monohydric alcohols such as methanol, ethanol, 1-propanol, 2-propanol, 1-butanol, and 2-butanol; dihydric alcohols such as ethylene glycol, propane glycol, and butanediol; dihydric alcohols including an ether bond such as diethylene glycol and dipropylene glycol; trihydric alcohols such as glycerol; and aprotic polar solvents such as dimethylformamide, dimethylacetamide, dimethyl sulfoxide, acetonitrile, methylformamide, ethyl acetate, and tetrahydrofuran, and one kind or a combination of two or more kinds thereof can be used.

The content of the solvent in the mixture subjected to the acylation step is preferably 2.0% by mass or more and 75.0% by mass or less, more preferably 3.0% by mass or more and 60.0% by mass or less, and still more preferably 4.0% by mass or more and 30.0% by mass or less.

Consequently, acylation reaction of cellulose is allowed to more successfully proceed without excessively using the solvent.

[2-1-4] Other Components

The mixture subjected to the acylation step may include a component other than the above-described components. Hereinafter, such components are also referred to as "the other component" in this section.

Examples of the other components include a catalyst, hemicellulose, lignin, an organic acid, and an ion other than the certain ion described above.

Provided that the content of the other components in the mixture subjected to the acylation step is preferably 10.0% by mass or less, more preferably 7.0% by mass or less, and still more preferably 5.0% by mass or less.

[2-1-5] Reaction Conditions

In the acylation step, acylation reaction of cellulose is conducted while irradiating the mixture with microwaves of 0.4 GHz or more and 6.0 GHz or less.

The frequency of the microwaves with which the mixture is irradiated in this step may be 0.4 GHz or more and 6.0 GHz or less but is preferably 0.5 GHz or more and 5.8 GHz or less, more preferably 0.6 GHz or more and 3.0 GHz or less, and still more preferably 0.7 GHz or more and 2.0 GHz or less.

Consequently, acylation reaction of cellulose is allowed to more successfully proceed, the proportion of the low molecular weight component of the cellulose derivative included in the molding material produced can be made smaller, and tensile strength of a molded body produced by using the molding material can be made more excellent. In addition, moldability in producing a molded body using the molding material can be made more excellent.

Duration of microwave irradiation to the mixture in this step is preferably 15 minutes or longer and 600 minutes or shorter, more preferably 30 minutes or longer and 450 minutes or shorter, and still more preferably 60 minutes or longer and 300 minutes or shorter.

Consequently, the proportion of the low molecular weight component of the cellulose derivative included in the molding material produced can be made smaller, and tensile strength of a molded body produced by using the molding material can be made more excellent. In addition, productivity of the molding material can be made more excellent.

In this step, a period for proceeding reaction without irradiating the mixture with microwaves may be given.

When such a period is given, the period without microwave irradiation in this step is preferably 60 minutes or shorter, more preferably 30 minutes or shorter, and still more preferably 15 minutes or shorter.

The temperature of the mixture in this step is preferably 5° C. or higher and 70° C. or lower, more preferably 10° C. or higher and 60° C. or lower, and still more preferably 15° C. or higher and 50° C. or lower.

[2-2] Cellulose Derivative Separation Step

The molding material production method of the present disclosure only needs to include at least the acylation step but may have a cellulose derivative separation step for separating the cellulose derivative from a composition obtained in the acylation step.

Consequently, the cellulose derivative can be separated from an excess solvent, an unreacted acylation agent and unreacted cellulose, a reaction product of the acylation agent and water or the like, and the like, and the purity and the content ratio of the cellulose derivative can be increased.

The cellulose derivative can be separated by precipitating the cellulose derivative from the composition obtained in the acylation step and filtering the cellulose derivative, for example.

Examples of a method of precipitating the cellulose derivative include a method of concentrating the composition obtained in the acylation step and a method of adding a poor solvent for the cellulose derivative to the composition obtained in the acylation step.

Incidentally, in the cellulose derivative separation step, it is not necessary to substantially fully remove components other than the cellulose derivative, and the separated cellulose derivative may include a predetermined ratio of another component such as the solvent.

However, the purity of the cellulose derivative separated in this step is preferably 90% by mass or more and more preferably 95% by mass or more.

[2-3] Kneading Step

The molding material production method of the present disclosure may further include a kneading step of kneading the cellulose derivative and a thermoplastic resin.

Consequently, thermoplasticity of the molding material produced is made more excellent, and moldability during production of a molded body is made more excellent. In addition, uniformity in the molding material and in a molded body produced by using the molding material is improved, and more excellent physical properties such as tensile strength are provided in a molded body.

Examples of the thermoplastic resin include polyolefins such as a polyethylene and a polypropylene, polyesters such as an aliphatic polyester like polylactic acid and an aromatic polyester, and one kind or a combination of two or more kinds selected therefrom can be used.

In particular, when the thermoplastic resin includes polylactic acid, the method has the following advantage. That is, since polylactic acid can be produced from a biological material, consumption of underground resources can be suppressed even when the thermoplastic resin is mixed. In addition, effects described above such as improvement in moldability and improvement in physical properties of a molded body produced by using the molding material are also sufficiently provided.

When the thermoplastic resin used in this step includes polylactic acid, the proportion of the polylactic acid accounting for the total amount of the thermoplastic resin used in this step is preferably 50.0% by mass or more, more preferably 60.0% by mass or more, and still more preferably 70.0% by mass or more. Consequently, the above-described effects are more significantly provided.

Although the amount of the thermoplastic resin used in this step is not particularly limited, when the amount of the cellulose derivative provided in this step is denoted as XC [mass %], and the amount of the thermoplastic resin provided in this step is denoted as XR [mass %], it is preferable that the relationship $0.12 \leq XR/XC \leq 4.1$ be satisfied, it is more preferable that the relationship $0.18 \leq XR/XC \leq 3.1$ be satisfied, and it is still more preferable that the relationship $0.26 \leq XR/XC \leq 1.3$ be satisfied. Consequently, the above-described effects are more significantly provided.

In addition, a component other than the thermoplastic resin may be kneaded with the cellulose derivative together with the thermoplastic resin in this step. Hereinafter, such components are also referred to as "the other components" in this section.

Examples of the other components include a flame retardant, a colorant, an insect repellent, a fungicide, an antioxidant, an ultraviolet absorber, an aggregation inhibitor, a mold release agent, cellulose, a derivative other than the cellulose derivative described above, and an ion other than the certain ion described above.

Provided that the content of the other components accounting for materials provided in this step is preferably 10.0% by mass or less, more preferably 7.0% by mass or less, and still more preferably 5.0% by mass or less.

Note that the other components may be preliminarily kneaded with the thermoplastic resin before being subjected to the kneading step.

A uniaxial kneader, a biaxial kneader, a multiaxial kneader, a mixer, and a roll Banbury machine can be used for kneading in this step, for example.

A strand-shaped molding material obtained by kneading may be subjected to pelletizing processing using a pelletizer, for example, a strand pelletizer, watering hot cut pelletizer, or the like to be made into a pellet-shaped molding material.

[2-4] Other Steps

The molding material production method of the present disclosure may include a step other than the steps described above. Examples of such a step include a pretreatment step for, for example, removing impurities from cellulose fibers, an intermediate treatment step like a washing step of washing the cellulose derivative prior to kneading with the thermoplastic resin, and a post-treatment for shaping a kneaded product into a predetermined shape.

[3] Molded Body

Next, a molded body produced by using the molding material of the present disclosure will be described.

The molded body according to the present disclosure includes: a cellulose derivative in which hydroxy groups included in cellulose are at least partially acylated; and at least one kind of ion selected from the group consisting of an imidazolium ion, a pyridinium ion, a lithium ion, and a chloride ion. The content ratio in the cellulose derivative of a low molecular weight component having a molecular weight of a quarter or less of a peak top molecular weight in a molecular weight distribution measured by gel permeation chromatography is 15% or less. In addition, in the molded body according to the present disclosure, electroconductivity at a temperature of 23° C. and a relative humidity of 50% at a site formed from material including the cellulose derivative and the ion is $1.0 \times 10^{-6}$ S/cm or more.

Consequently, a molded body with excellent tensile strength can be provided. In addition, electrification of the molded body can be successfully prevented.

The molded body according to the present disclosure as described above can be preferably produced using the molding material of the present disclosure described above.

The respective components constituting the molded body preferably satisfy the requirements described in [1-1] to [1-5] above. However, the content of the solvent in the molded body is preferably 1.0% by mass or less.

The shape of the molded body is not particularly limited and may be any shape such as a sheet shape, a block shape, a spherical shape, and a three-dimensional shape.

Although the molded body may be applied to any application, examples of the application thereof include various housings such as housings for printers, ink cartridges, and various containers.

In particular, since generation of dust is effectively prevented in the molded body according to the present disclosure, the molded body can be suitably applied to an ink cartridge and the like in which generation of dust is especially problematic.

Furthermore, since electrification of the molded body according to the present disclosure is effectively prevented, the molded body can be preferably applied to members easily charged through friction, such as electrical appliances and precision apparatuses.

The molded body according to the present disclosure may be produced by any method but can be preferably produced by injection molding, press molding, and the like using the molding material of the present disclosure described above, for example.

Hereinabove, preferable embodiments of the present disclosure have been described. However, the present disclosure is not limited thereto.

EXAMPLES

Next, specific examples of the present disclosure will be described.

[4] Production of Molding Material
[4-1] Production of Molding Material Including No Thermoplastic Resin Example 1

To 100 parts by mass of cellulose (manufactured by Nippon Paper Industries Co., Ltd., dissolving pulp, polymerization degree: 750, square sheet shape of about 3 mm) were added 5 parts by mass of 1-allyl-3-butylimidazolium bromide (manufactured by KANTO CHEMICAL CO., INC.) as an ionic liquid, 10 parts by mass of dimethylacetamide (manufactured by KANTO CHEMICAL CO., INC.), and 6 equivalents, based on all hydroxy groups included in the cellulose, of propionic anhydride (manufactured by KANTO CHEMICAL CO., INC.) as an acylation agent, followed by stirring at 35° C. under a nitrogen atmosphere for 4 hours to conduct acylation reaction. At this time, the reaction solution was irradiated, through a waveguide, with microwaves having a frequency of 0.4 GHz generated by a microwave oscillator.

After reaction, a cellulose derivative was precipitated. The precipitated cellulose derivative was filtered, and the cycle of washing with 500 parts by mass of water and filtration was repeated three times, followed by vacuum drying at 80° C. for 4 hours to obtain a molding material.

Example 2

To 100 parts by mass of cellulose (manufactured by Nippon Paper Industries Co., Ltd., dissolving pulp, polymerization degree: 750, square sheet shape of about 3 mm) were added 5 parts by mass of 1-allyl-3-butylimidazolium bromide (manufactured by KANTO CHEMICAL CO., INC.) as an ionic liquid, 10 parts by mass of dimethylacetamide (manufactured by KANTO CHEMICAL CO., INC.), and 6 equivalents, based on all hydroxy groups included in the cellulose, of propionic anhydride (manufactured by KANTO CHEMICAL CO., INC.) as an acylation agent, followed by stirring at 35° C. under a nitrogen atmosphere for 2 hours to conduct acylation reaction. At this time, the reaction solution was irradiated, through a waveguide, with microwaves having a frequency of 0.915 GHz generated by a microwave oscillator.

After reaction, a cellulose derivative was precipitated. The precipitated cellulose derivative was filtered, and the cycle of washing with 500 parts by mass of water and filtration was repeated three times, followed by vacuum drying at 80° C. for 4 hours to obtain a molding material.

Example 3

To 100 parts by mass of cellulose (manufactured by Nippon Paper Industries Co., Ltd., dissolving pulp, polymerization degree: 750, square sheet shape of about 3 mm) were added 5 parts by mass of 1-allyl-3-butylimidazolium bromide (manufactured by KANTO CHEMICAL CO., INC.) as an ionic liquid, 10 parts by mass of dimethylacetamide (manufactured by KANTO CHEMICAL CO., INC.), and 6 equivalents, based on all hydroxy groups included in the cellulose, of propionic anhydride (manufactured by KANTO CHEMICAL CO., INC.) as an acylation agent, followed by stirring at 35° C. under a nitrogen atmosphere for 4 hours to conduct acylation reaction. At this time, the reaction solution was irradiated, through a waveguide, with microwaves having a frequency of 5.8 GHz generated by a microwave oscillator.

After reaction, a cellulose derivative was precipitated. The precipitated cellulose derivative was filtered, and the cycle of washing with 500 parts by mass of water and filtration was repeated three times, followed by vacuum drying at 80° C. for 4 hours to obtain a molding material.

Example 4

To 100 parts by mass of cellulose (manufactured by Nippon Paper Industries Co., Ltd., dissolving pulp, polymerization degree: 750, square sheet shape of about 3 mm) were added 5 parts by mass of 1-butyl-3-methylpyridinium bis(trifluoromethylsulfonyl)imide (manufactured by KANTO CHEMICAL CO., INC.) as an ionic liquid, 10 parts by mass of dimethylacetamide (manufactured by KANTO CHEMICAL CO., INC.), and 6 equivalents, based on all hydroxy groups included in the cellulose, of propionic anhydride (manufactured by KANTO CHEMICAL CO., INC.) as an acylation agent, followed by stirring at 35° C. under a nitrogen atmosphere for 4 hours to conduct acylation reaction. At this time, the reaction solution was irradiated, through a waveguide, with microwaves having a frequency of 0.915 GHz generated by a microwave oscillator.

After reaction, a cellulose derivative was precipitated. The precipitated cellulose derivative was filtered, and the cycle of washing with 500 parts by mass of water and filtration was repeated three times, followed by vacuum drying at 80° C. for 4 hours to obtain a molding material.

Example 5

To 100 parts by mass of cellulose (manufactured by Nippon Paper Industries Co., Ltd., dissolving pulp, polymerization degree: 750, square sheet shape of about 3 mm) were added 5 parts by mass of lithium chloride (manufactured by KANTO CHEMICAL CO., INC.) as a salt, 10 parts by mass of dimethylacetamide (manufactured by KANTO CHEMICAL CO., INC.), and 6 equivalents, based on all hydroxy groups included in the cellulose, of propionic anhydride (manufactured by KANTO CHEMICAL CO., INC.) as an acylation agent, followed by stirring at 35° C. under a nitrogen atmosphere for 4 hours to conduct acylation reaction. At this time, the reaction solution was irradiated, through a waveguide, with microwaves having a frequency of 0.915 GHz generated by a microwave oscillator.

After reaction, a cellulose derivative was precipitated. The precipitated cellulose derivative was filtered, and the cycle of washing with 500 parts by mass of water and filtration was repeated three times, followed by vacuum drying at 80° C. for 4 hours to obtain a molding material.

Example 6

To 100 parts by mass of cellulose (manufactured by Nippon Paper Industries Co., Ltd., dissolving pulp, polymerization degree: 750, square sheet shape of about 3 mm) were added 5 parts by mass of 1-allyl-3-butylimidazolium bromide (manufactured by KANTO CHEMICAL CO., INC.) as an ionic liquid, 10 parts by mass of dimethylacetamide (manufactured by KANTO CHEMICAL CO., INC.), and 9 equivalents, based on all hydroxy groups included in the cellulose, of propionic anhydride (manufactured by KANTO CHEMICAL CO., INC.) as an acylation agent, followed by stirring at 35° C. under a nitrogen atmosphere for 2 hours to conduct acylation reaction. At this time, the reaction solution was irradiated, through a waveguide, with microwaves having a frequency of 0.915 GHz generated by a microwave oscillator.

After reaction, a cellulose derivative was precipitated. The precipitated cellulose derivative was filtered, and the cycle of washing with 500 parts by mass of water and filtration was repeated three times, followed by vacuum drying at 80° C. for 4 hours to obtain a molding material.

Example 7

To 100 parts by mass of cellulose (manufactured by Nippon Paper Industries Co., Ltd., dissolving pulp, polymerization degree: 750, square sheet shape of about 3 mm) were added 5 parts by mass of 1-allyl-3-butylimidazolium bromide (manufactured by KANTO CHEMICAL CO., INC.) as an ionic liquid, 10 parts by mass of dimethylacetamide (manufactured by KANTO CHEMICAL CO., INC.), and 8 equivalents, based on all hydroxy groups included in the cellulose, of propionic anhydride (manufactured by KANTO CHEMICAL CO., INC.) as an acylation agent, followed by stirring at 35° C. under a nitrogen atmosphere for 2 hours to conduct acylation reaction. At this time, the reaction solution was irradiated, through a waveguide, with microwaves having a frequency of 0.915 GHz generated by a microwave oscillator.

After reaction, a cellulose derivative was precipitated. The precipitated cellulose derivative was filtered, and the cycle of washing with 500 parts by mass of water and filtration was repeated three times, followed by vacuum drying at 80° C. for 4 hours to obtain a molding material.

Example 8

To 100 parts by mass of cellulose (manufactured by Nippon Paper Industries Co., Ltd., dissolving pulp, polymerization degree: 750, square sheet shape of about 3 mm) were added 5 parts by mass of 1-allyl-3-butylimidazolium bromide (manufactured by KANTO CHEMICAL CO., INC.) as an ionic liquid, 10 parts by mass of dimethylacetamide (manufactured by KANTO CHEMICAL CO., INC.), and 0.2 equivalents, based on all hydroxy groups included in the cellulose, of propionic anhydride (manufactured by KANTO CHEMICAL CO., INC.) as an acylation agent, followed by stirring at 35° C. under a nitrogen atmosphere for 2 hours to conduct acylation reaction. At this time, the reaction solution was irradiated, through a waveguide, with microwaves having a frequency of 0.915 GHz generated by a microwave oscillator.

After reaction, a cellulose derivative was precipitated. The precipitated cellulose derivative was filtered, and the cycle of washing with 500 parts by mass of water and filtration was repeated three times, followed by vacuum drying at 80° C. for 4 hours to obtain a molding material.

Comparative Example 1

To 100 parts by mass of cellulose (manufactured by Nippon Paper Industries Co., Ltd., dissolving pulp, polymerization degree: 750, square sheet shape of about 3 mm) were added 5 parts by mass of 1-allyl-3-butylimidazolium bromide (manufactured by KANTO CHEMICAL CO., INC.) as an ionic liquid, 10 parts by mass of dimethylacetamide (manufactured by KANTO CHEMICAL CO., INC.), and 6 equivalents, based on all hydroxy groups included in the cellulose, of propionic anhydride (manufactured by KANTO CHEMICAL CO., INC.) as an acylation agent, followed by stirring at 35° C. under a nitrogen atmosphere for 6 hours to conduct acylation reaction. At this time, the reaction solution was irradiated, through a waveguide, with microwaves having a frequency of 0.3 GHz generated by a microwave oscillator.

After reaction, a cellulose derivative was precipitated. The precipitated cellulose derivative was filtered, and the cycle of washing with 500 parts by mass of water and filtration was repeated three times, followed by vacuum drying at 80° C. for 4 hours to obtain a molding material.

Comparative Example 2

To 100 parts by mass of cellulose (manufactured by Nippon Paper Industries Co., Ltd., dissolving pulp, polymerization degree: 750, square sheet shape of about 3 mm) were added 5 parts by mass of 1-allyl-3-butylimidazolium bromide (manufactured by KANTO CHEMICAL CO., INC.) as an ionic liquid, 10 parts by mass of dimethylacetamide (manufactured by KANTO CHEMICAL CO., INC.), and 6 equivalents, based on all hydroxy groups included in the cellulose, of propionic anhydride (manufactured by KANTO CHEMICAL CO., INC.) as an acylation agent, followed by stirring at 35° C. under a nitrogen atmosphere for 6 hours to conduct acylation reaction. At this time, the reaction solution was irradiated, through a waveguide, with microwaves having a frequency of 20 GHz generated by a microwave oscillator.

After reaction, a cellulose derivative was precipitated. The precipitated cellulose derivative was filtered, and the cycle of washing with 500 parts by mass of water and filtration was repeated three times, followed by vacuum drying at 80° C. for 4 hours to obtain a molding material.

Comparative Example 3

To 100 parts by mass of cellulose (manufactured by Nippon Paper Industries Co., Ltd., dissolving pulp, polymerization degree: 750, square sheet shape of about 3 mm) were added 10 parts by mass of dimethylacetamide (manufactured by KANTO CHEMICAL CO., INC.) and 6 equivalents, based on all hydroxy groups included in the cellulose, of propionic anhydride (manufactured by KANTO CHEMICAL CO., INC.) as an acylation agent, followed by stirring at 35° C. under a nitrogen atmosphere for 6 hours to conduct acylation reaction. At this time, the reaction solution was irradiated, through a waveguide, with microwaves having a frequency of 0.915 GHz generated by a microwave oscillator.

After reaction, a cellulose derivative was precipitated. The precipitated cellulose derivative was filtered, and the cycle of washing with 500 parts by mass of water and filtration was repeated three times, followed by vacuum drying at 80° C. for 4 hours to obtain a molding material.

Comparative Example 4

To 100 parts by mass of cellulose (manufactured by Nippon Paper Industries Co., Ltd., dissolving pulp, polymerization degree: 750, square sheet shape of about 3 mm) were added 5 parts by mass of 1-allyl-3-butylimidazolium bromide (manufactured by KANTO CHEMICAL CO., INC.) as an ionic liquid, 10 parts by mass of dimethylacetamide (manufactured by KANTO CHEMICAL CO., INC.), and 0.1 equivalents, based on all hydroxy groups included in the cellulose, of propionic anhydride (manufactured by KANTO CHEMICAL CO., INC.) as an acylation agent, followed by stirring at 35° C. under a nitrogen atmosphere for 2 hours to conduct acylation reaction. At this time, the reaction solution was irradiated, through a waveguide, with microwaves having a frequency of 0.915 GHz generated by a microwave oscillator.

After reaction, a cellulose derivative was precipitated. The precipitated cellulose derivative was filtered, and the cycle of washing with 500 parts by mass of water and filtration was repeated three times, followed by vacuum drying at 80° C. for 4 hours to obtain a molding material.

[4-2] Production of Molding Material Including Thermoplastic Resin

The molding material of each of the examples and the comparative examples, that is, each of the molding materials including no thermoplastic resin was mixed with the same mass of polylactic acid (manufactured by TOMOE ENGINEERING CO., LTD., PLA (polylactic acid) L105) to obtain a mixture, the mixture was kneaded using a biaxial kneader (manufactured by TECHNOVEL CORPORATION, KZW15TW-45MG-NH) with the maximum heating temperature of 220° C. and extruded, and a molding material having a pellet shape, that is, a molding material including a thermoplastic resin was obtained thereby.

[5] Measurement and Evaluation

[5-1] Electroconductivity

Volume electroconductivity of the molding material including no thermoplastic resin of each of the examples and the comparative examples was measured under an environment in which the temperature was 23° C. and the relative humidity was 50%.

The volume electroconductivity was measured as follows. That is, each sample was placed in a chamber under an environment in which the temperature was 23° C. and the relative humidity was 50% and left to stand for one hour. Thereafter, in accordance with JIS K6723, a direct voltage of 100 V was applied using a brass electrode and a current meter, and the current value was measured after charging of one minute. The volume electroconductivity was calculated by the following formula. A main electrode with a diameter of 50 mm and a height of 35 mm, a guard electrode with an outer diameter of 80 mm, an inner diameter of 70 mm and a height of 10 mm, and a counter electrode with a size of 300×150×2 mm were used.

$$\rho = (\Pi d2/4t)Rv$$

ρ: Volume resistivity (Ω·cm)
d: Diameter of main electrode (cm)
t: Thickness of test piece (cm)
Rv: Volume resistance (Q)

[5-2] Molecular Weight Distribution

The weight average molecular weight and the molecular weight distribution of the cellulose derivative included in the molding material including no thermoplastic resin of each of the examples and the comparative examples were measured by gel permeation chromatography as follows.

That is, a solution obtained by dissolving each molding material in solution A in which LiBr was added to N-methyl-2-pyrrolidone so as to achieve 0.1 mol/L was subjected to measurement with a refractive index detector (RI) at a temperature of 55° C. using gel permeation chromatography (GPC) (main body: manufactured by SHIMADZU CORPORATION, HPLC Prominence) to which a column was coupled. The column included a guard column (manufactured by Agilent Technologies, Inc., PolyPore GUARD, size: 50×7.5 mm) and a main column (former stage: manufactured by Agilent Technologies, Inc., PolyPore, size: 300× 7.5 mm; latter stage: manufactured by Agilent Technologies, Inc., PolyPore, size: 300×7.5 mm). The measurement conditions were as follows: mobile phase was solution A, and the column temperature was 55° C. The relationship between the known molecular weight of polymethyl methacrylate (M-M-10 calibration kit) manufactured by Agilent Technologies, Inc. and the GPC measurement value (retention time) of the cellulose derivative was used for calculation of the molecular weight and the molecular weight distribution of a polymer.

[5-3] Moldability

Adequacy of molding in an injection molding machine was evaluated for the molding material including no thermoplastic resin of each of the examples and the comparative examples.

Good molding conveyance performance means that the molding material can be stably supplied when the molding material is put into a molding machine, and the load does not excessively increase. Good injection performance means that the molding material can be molded into a desired shape without generation of bubbles and deterioration in color and the like. A molding material with good molding conveyance performance and good injection performance was rated as "A", a molding material which had a problem in either molding conveyance performance or injection performance but could be molded was rated as "B", a molding material which had problems in both molding conveyance performance and injection performance but could be molded was rated as "C", and a molding material which could not be molded was rated as "D."

[5-4] Tensile Strength of Molded Body

A molded body was produced using the molding material including no thermoplastic resin of each of the examples and the comparative examples as follows, and tensile strength thereof was measured.

First, each molding material was kneaded using a biaxial kneader (manufactured by TECHNOVEL CORPORATION, KZW15TW-45MG-NH) with the maximum heating temperature of 220° C. and extruded, and thereby processed into a pellet shape. The pellet-shaped molding material was molded, with an injection molding machine (manufactured by Sumitomo Heavy Industries, Ltd., SE-EV-A), into a standard shape (test piece type 2) for plastic physical property evaluation described in JIS K7127 to obtain a tensile test piece. Tensile strength of the tensile test piece was measured, with a tensile strength tester (Instron test machine 5567 manufactured by Instron), under the following conditions: the distance between marked lines was 25 mm; and the test speed was 50 mm/min. The tensile strength was evaluated according to the following criteria. Stronger tensile strength is preferable. Determination is as follows.

A: Tensile strength is 40 MPa or more
B: Tensile strength is 30 MPa or more and less than 40 MPa
C: Tensile strength is 20 MPa or more and less than 30 MPa
D: Tensile strength is less than 20 MPa A tensile test piece was produced in the same manner as described above except that a pellet-shaped molding material including a thermoplastic resin, that is, each molding material produced in [4-2] above was used instead of the pellet-shaped molding materials including no thermoplastic resin of the examples and the comparative examples, and tensile strength was measured and evaluated in the same manner according to the same criteria as described above.

Measurement results and evaluation results thereof are collectively shown in FIGURE together with the production conditions for the molding materials including no thermoplastic resin according to the examples and the comparative examples.

In FIGURE, use amounts of the acylation agent based on all hydroxy groups included in cellulose used as a raw material are represented by equivalents in the column of the acylation agent use amount.

As is clear from FIGURE, superior results were obtained in the examples. On the other hand, satisfactory results were not obtained in the comparative examples.

What is claimed is:

1. A molding material comprising:
    a cellulose derivative in which hydroxy groups included in cellulose are at least partially acylated; and
    at least one kind of ion selected from the group consisting of an imidazolium ion, a pyridinium ion, a lithium ion, and a chloride ion, wherein
    a content of the at least one kind of ion is in the range of 0.1% by mass or more and 0.5% by mass or less,
    a content ratio in the cellulose derivative of a low molecular weight component having a molecular weight of a quarter or less of a peak top molecular weight in a molecular weight distribution measured by gel permeation chromatography is 15% or less, and
    electroconductivity at a temperature of 23° C. and a relative humidity of 50% is $1.0 \times 10^{-6}$ S/cm or more.

2. The molding material according to claim 1, wherein the electroconductivity of the molding material at a temperature of 23° C. and a relative humidity of 50% is $1.0 \times 10^7$ S/cm or less.

3. The molding material according to claim 1, further comprising a thermoplastic resin.

4. The molding material according to claim 3, wherein the thermoplastic resin includes polylactic acid.

5. The molding material according to claim 1, wherein the molding material includes a plurality of thermoplastic resins that includes polylactic acid in an amount of 50% or more relative to a total amount of the thermoplastic resins.

* * * * *